United States Patent
Gill

(10) Patent No.: US 8,346,025 B2
(45) Date of Patent: Jan. 1, 2013

(54) COMPACT ELECTROOPTIC MODULATOR

(75) Inventor: Douglas M. Gill, South Orange, NJ (US)

(73) Assignee: Alcatel Lucent, Paris (FR)

( * ) Notice: Subject to any disclaimer, the term of this patent is extended or adjusted under 35 U.S.C. 154(b) by 524 days.

(21) Appl. No.: 12/467,867

(22) Filed: May 18, 2009

(65) Prior Publication Data

US 2010/0290732 A1 Nov. 18, 2010

(51) Int. Cl.
*G02F 1/35* (2006.01)
*G02B 6/32* (2006.01)

(52) U.S. Cl. ............... 385/3; 385/40; 385/131; 438/29; 438/31

(58) Field of Classification Search .................. 385/1–3, 385/39, 40, 129–132; 438/29, 31
See application file for complete search history.

(56) References Cited

U.S. PATENT DOCUMENTS

| 6,101,296 | A | 8/2000 | Tavlykaev et al. |
| 7,088,875 | B2* | 8/2006 | Sugiyama et al. .............. 385/3 |
| 2005/0175271 | A1 | 8/2005 | Sugiyama et al. |
| 2006/0210212 | A1 | 9/2006 | Sugiyama |

OTHER PUBLICATIONS

Green, William M.J.; "Ultra-Compact, Low RF Power, 10 Gb/s Silicon Mach-Zehnder Modulator"; Dec. 10, 2007/vol. 15, No. 25; Optics Express; pp. 17106-171113.

* cited by examiner

*Primary Examiner* — Brian M. Healy
*Assistant Examiner* — Mary El Shammaa
(74) *Attorney, Agent, or Firm* — Hitt Gaines, PC

(57) ABSTRACT

An apparatus 100 that comprises a planar electro-optic modulator 110 being located on a substrate 105 and including a waveguide 115 and electrical contacts 120. The waveguide that includes first and second substantially straight segments 122, and a curved segment 126 that serially end-connects the first and second substantially straight segments such that light 130 travels in a substantially anti-parallel manner in the first and second substantially straight segments. The electrical contacts being located adjacent the first and second substantially straight segments and being connected to produce constructively adding phase modulations on an optical carrier passing through the segments.

22 Claims, 9 Drawing Sheets

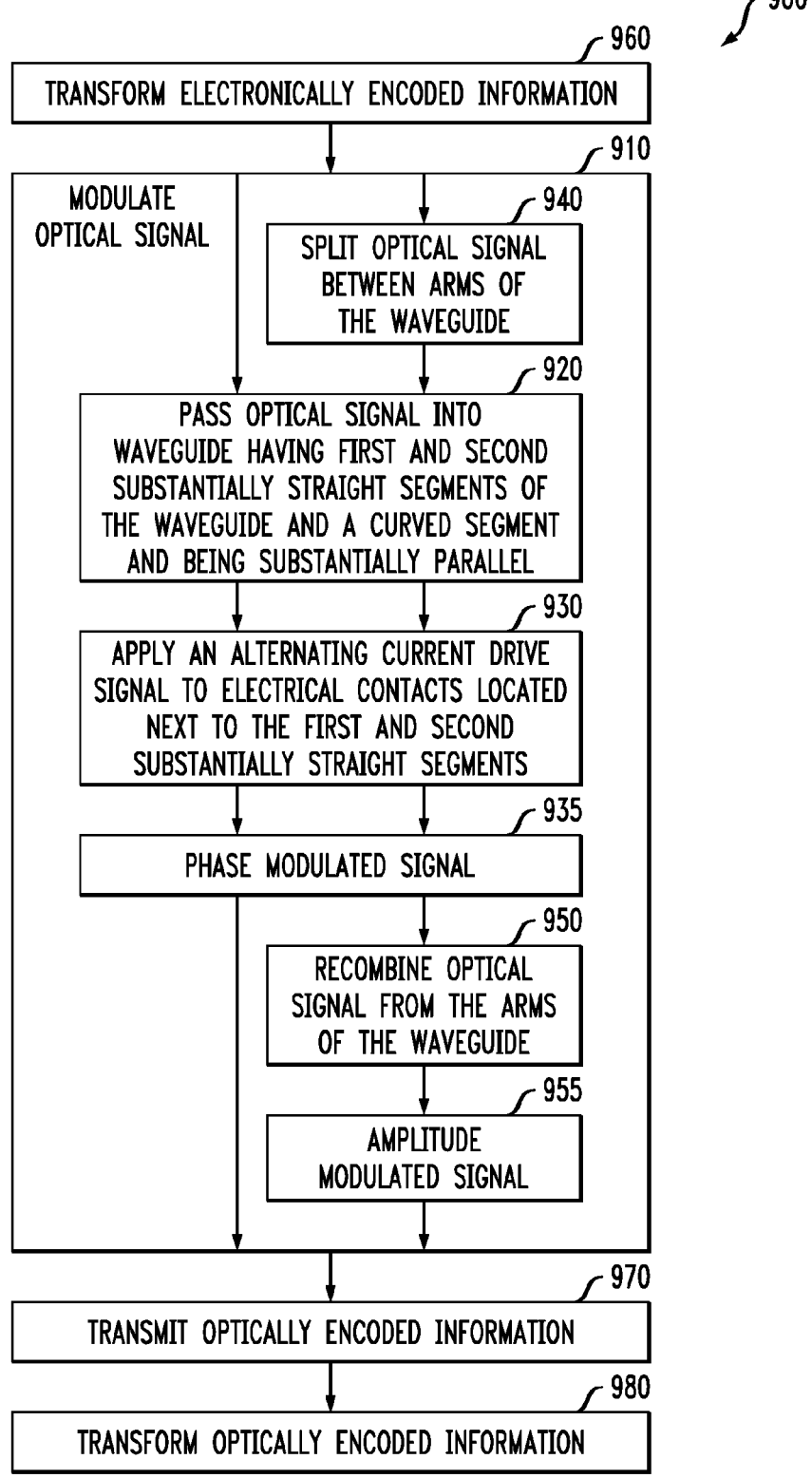

US 8,346,025 B2

COMPACT ELECTROOPTIC MODULATOR

U.S. GOVERNMENT CONTRACT

The U.S. Government has a paid-up license to the subject matter of this application and the right in limited circumstances to require the patent owner to license others on reasonable terms as provided for by the terms of Contract No. HR0011-05-C-0027 awarded under DARPA/EPIC.

TECHNICAL FIELD OF THE INVENTION

The present invention is directed, in general, to mixed electronic and optical devices and, more specifically, to electro-optic devices and methods for manufacturing the same.

BACKGROUND OF THE INVENTION

This section introduces aspects that may help facilitate a better understanding of the disclosure. Accordingly, these statements are to be read in this light and are not to be understood as admissions about what is prior art or what is not prior art.

There is great interest in the use of mixed electronic photonic devices in telecommunication and computational applications. Electro-optic modulators with compact size and reduced drive power are of interest for information transmission in electronic photonic devices.

SUMMARY OF THE INVENTION

One embodiment of the present disclosure includes an apparatus that comprises a planar electro-optic modulator being located on a substrate and including a waveguide and electrical contacts. The waveguide that includes first and second substantially straight segments and a curved segment that serially end-connects the first and second substantially straight segments such that an optical signal travels in a substantially anti-parallel manner in the first and second substantially straight segments. The electrical contacts being located adjacent the first and second substantially straight segments and being connected to produce constructively adding phase modulations on the optical signal passing through the segments.

Another embodiment is a method of manufacturing the electronic-photonic device which comprises fabricating an electro-optic modulator. Fabricating the electro-optic modulator includes forming an optical waveguide on a planar substrate, the optical waveguide including a first substantially straight segment, a second substantially straight segment, and a curved segment, the first and second substantially straight segments being substantially parallel and being end-coupled by the curved segment. Fabricating also includes forming electrical contacts adjacent the first substantially straight segment and the second substantially straight segment.

Another embodiment is a method of transforming information that comprises modulating an optical signal. Modulating the optical signal includes passing the optical signal into a waveguide, the waveguide having a first substantially straight segment and a second substantially straight segment and a curved segment, the first and said second substantially straight segments being end-coupled by the curved segment and being substantially parallel. Modulating also comprises applying an alternating current drive signal to electrical contacts located next to the first and second substantially straight segments to modulate the optical signal.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which:

FIG. 9 shows flow diagram of an example embodiment of a method of transforming information in accordance with the disclosure, for example using the electronic-photonic devices of FIGS. 1A-7.

DETAILED DESCRIPTION

This section introduces aspects that may help facilitate a better understanding of the disclosure. Accordingly, the statements of this section are to be read in this light and are not to be understood as admissions about what is prior art or what is not prior art.

A number of example embodiments are presented below in the context of electronic-photonic device, and electro-optic modulators that include silicon and silicon oxide layers of a silicon-on-insulator (SOI) substrates. One skilled in the art, however, would appreciate how the disclosure could also be applied using other types of semiconductor substrates having no intrinsic electro-optic susceptibility, or other semiconductor materials that do have intrinsic electro-optic susceptibility (e.g., InP, GaAs substrate layers), or insulating materials that have an intrinsic electro-optic susceptibility (e.g., $LiNbO_3$, $BaTiO_3$, calcogenide glasses)

Figure 1A:
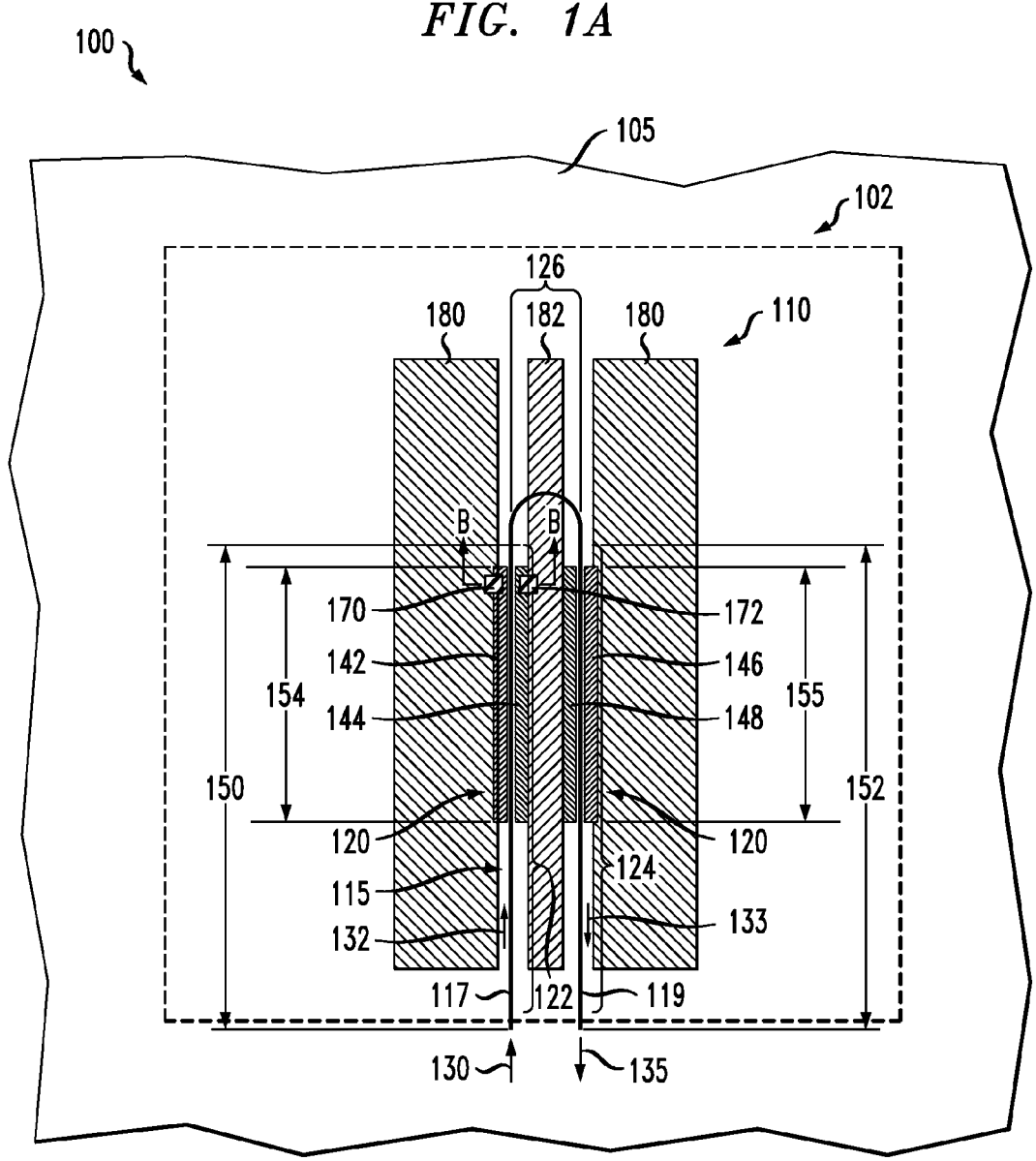
FIG. 1A shows a plan view of an example embodiment of an apparatus of the disclosure comprising an electronic-photonic device.

FIGS. 1A-5 show plan and cross-sectional views of example embodiments of apparatuses 100 of the disclosure which comprise an electronic-photonic device 102. In some cases, the device 102 is a planar electro-optical device. The plan views depict certain overlying structures as being transparent or semitransparent so that underlying structures can be clearly shown. For clarity, the same reference numbers are used to depict similar features of the devices 102. FIG. 1A presents a plan view of one embodiment of the device 102.

Figure 1B:
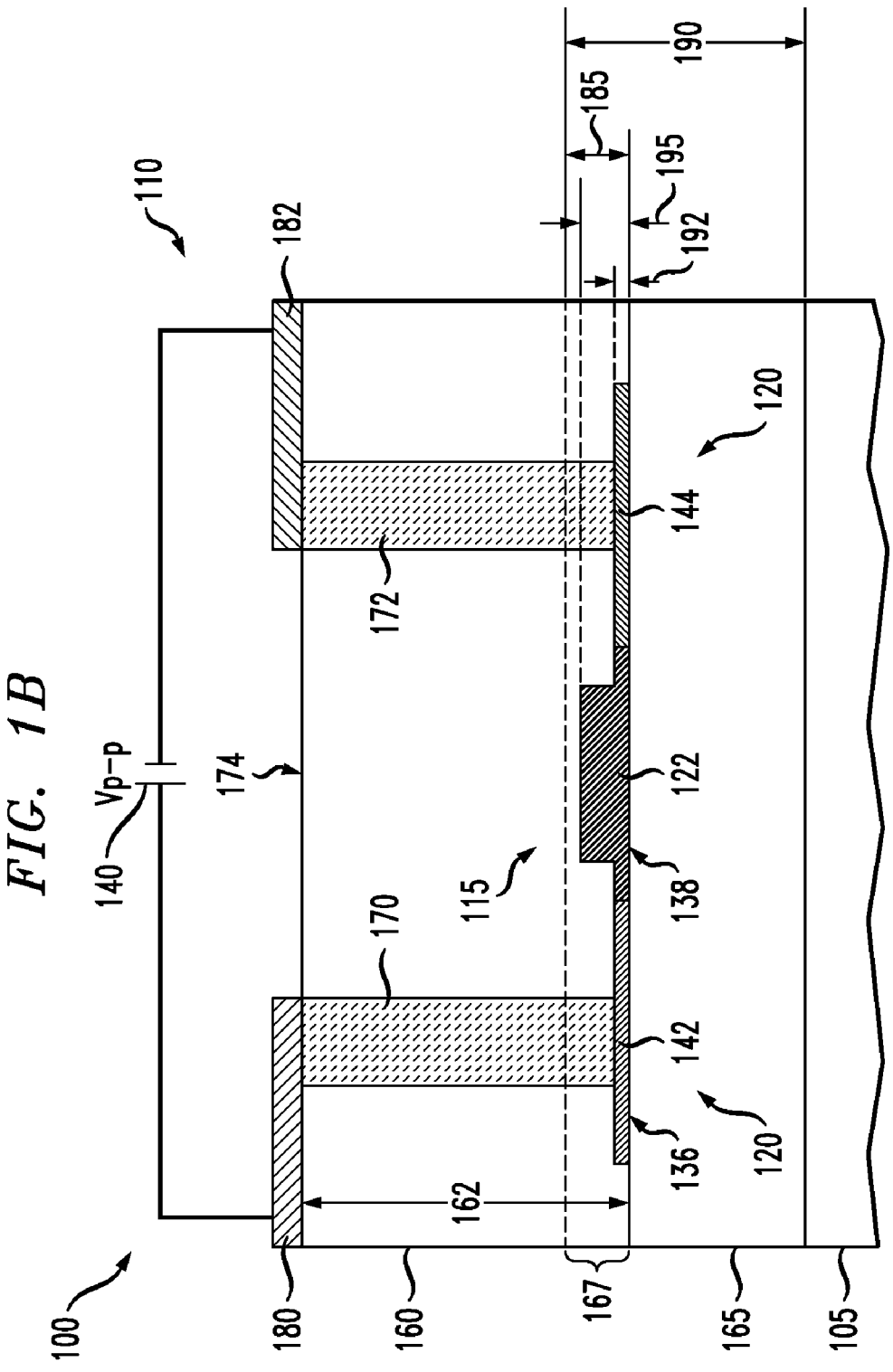
FIG. 1B shows a cross-sectional view of the device shown in FIG. 1A, corresponding to view line B-B in FIG. 1A.

FIG. 1B presents a cross-sectional view of the device, corresponding to view line B-B in FIG. 1A.

The electronic-photonic device 102 can be part of an apparatus 100 (other components not show), or in some cases, the device 102 can be the entire apparatus itself. The electronic-photonic device 102 is located on a substrate 105. In some cases the device 102 includes or is an electro-optic modulator 110, and in some cases, a planar electro-optic modulator 110. The modulator 110 has an optical waveguide 115 (e.g., having an input end 117 and an output end 119) and electrical contacts 120. As shown in FIG. 1B, the waveguide 115 can be a ridged optical waveguide. That is, the optical core of the waveguide 115 has a ridge that provides for guiding of light signals therein.

With continuing reference to FIG. 1B, the waveguide 115 includes a first segment 122 and a second segment 124 that are separated from each other by a curved segment 126 (e.g., a folded region) of the waveguide 115. In some cases, the first segment 122 and a second segment 124 are substantial straight segments of the waveguide 115. The term substantially straight as used herein refers to a waveguide substantially straight segment having a radius of curvature of that is at least 5 to 10 times greater than the radius of curvature of the curved segment 126 and preferably is 20 or more times greater or is 40 or more times greater than the radius of curvature of the curved segment 126. In some cases, the substantial straight segments are substantially parallel to each other. Substantially parallel as used herein means that the segments 122, 124 deviate in a direction by less than about 20 degrees.

The first segment 122 and second segment 124 are continuous parts of the waveguide 115. E.g., substantially straight segments 122, 124 are optically end-connected to each other by the curved segment 126 of the optical waveguide 115. The first and second segments 122, 124 are oriented such that an input optical signal or carrier 130 (e.g., a visible or infrared light signal) traveling through the first segment 122 travels in an opposite direction (e.g., direction 132) than the input optical signal 130 traveling through the second segment 124 (e.g., direction 133) and exits the waveguide as an output signal 135. E.g., during operation the signal 130 can travel in substantially opposite or anti-parallel directions 132, 133 thereinthrough the first and second substantially straight segments 122, 124 to produce a modulated output signal 135.

As a result of the manufacture of the device 102, the electrical contacts 120 located along the first segment 122 and second segments 124 of the waveguide 115. In some cases the electrical contacts 120 can be substantially coplanar with the waveguide 115 (e.g., core regions of the waveguide). For instance as shown in FIG. 1B, at least on side 136 of the electrical contacts 120 can be coplanar with at least one side 138 of the core region of the waveguide 115.

The electrical contacts 120 are configured to operate on both of the first segment 122 and the second segment 124. In some cases, an electrical field (e.g., a radio-frequency field) emanating from the electrical contacts 120 passes through the waveguide 115 such that a phase of the input optical signal 130 substantially changes in a same direction (e.g., both positive or both negative phase changes) in both of the segments 122, 124 (FIG. 1A) when a drive signal 140 (FIG. 1B) is applied to the electrical contacts 120. E.g., an electrical field produced by charges on the electrical contacts 120 can control the values of the refractive indexes of the first and second segments 122, 124 of the optical waveguide 115, via an electro-optical effect. The electrical contacts 120 can be positioned and electrically driven such that the driving electrical signal 140 causes a phase change to the input optical signal 130 in a same direction in both substantially straight segments 122, 124 (FIG. 1A-1B). For example, the electric signals 140 applied to the contacts 120 may increase the total phase change across the first substantially straight segment 122 and simultaneously increase the total phase change across the second substantially straight segment 124. Alternatively, the electric signals applied to the contacts 120 may decrease the total phase change across substantially straight segment 122 and simultaneously decrease the total phase change across substantially straight segment 124. Consequently, the total phase variation that the signal 130 experiences as it propagates through the waveguide 115 can be substantially increased. For instance, the substantial increase can be due to the presence of both substantially straight segments 122, 124 and the driving thereof (e.g., doubled, in some cases) with respect to the total phase variation that the optical signal 130 would experience in the presence of an electrical signal driving only one of the two substantially straight segments 122, 124. This, in turn, increases (e.g., doubles) the amount of phase modulation of the signal 135 at the output end 119 of the waveguide 115, as compared to some conventional lumped-element modulator designs. For instance, as compared to a lumped-element modulator design in which the modulated optical substantially straight segment is shorter than the combined length of the two substantially straight segments 122, 124. Alternately, due to their large interactions, the lengths of the segments 122, 124 where electrical field and optical signal 130 interactions occur (e.g., refractive-index-mediated interactions) could be proportionally reduced while still realizing a similar modulation intensity of the output signal 135.

For the purposes of the disclosure, a substantial change in the phase of the input optical signal 130 is considered to be an about ±10 degree or greater change. For the purposes of the disclosure, the drive signal 140 refers to the peak-to-peak voltage ($V_{p-p}$) applied across the electrical contacts 120. E.g., the voltage could be applied across each pair of contacts 120 that straddles one of the substantially straight segments 122, 124.

To facilitate changing the phase in the same direction in both segments 122, 124 of the waveguide 115 the electrical contacts 120 can be configured and driven such that the two segments 122, 124 experience substantially oppositely oriented electrical fields when the drive signal 140 is applied. For instance, the configuration and driving can be such that adjacent parts of two substantially straight segments 122, 124 experience electrical fields of similar strength and about opposite orientation. For example, the embodiment of electrical contacts 120 shown in FIG. 1A can include a first anode 142 and first cathode 144 pair, and, a second anode 146 and second cathode 148 pair. As illustrated, the first anode 142 and first cathode 144 are both adjacent and on opposite sides of the first segment 122, and, the second anode 146 and second cathode 148 are both adjacent and on opposite sides of the second segment 124. As shown in FIG. 1A, the first cathode 144 can be adjacent to the second cathode 148. In the illustrated embodiment, the first cathode 144 is to the right of the first segment 122 and the first anode 142 is to the left of the first segment 122. The second cathode 148 is to the left of the second segment 124 and the second anode 146 is to the right of the second segment 124. In view of this disclosure one skilled in the art would appreciate that other embodiments including inverted configurations of cathodes and anodes than described above. For instance, in other embodiments the first anode 142 can be adjacent the second anode 146 (not shown). In still other cases, the first and second anode may be combined to form a single anode contact, or, the first and second contacts may be combined to form a single cathode contact (not shown).

For the above-described configuration, when a voltage 140 is applied across the first and second anode-cathode pairs, the electro-optic susceptible material of the waveguide 115 in the first segment 122 will have a substantially opposite polarization as the polarization of electro-optic susceptible material in the second segment 124. As a result, the total phase change of the signal 130 propagating therethrough changes in the same direction in both segments 122, 124 of the waveguide 115, thereby enhancing the response of the optical signal 130 exiting the waveguide at the output end 119, to the applied electrical signal 140.

As noted above and as illustrated in FIG. 1A, in some cases, to optimize the efficient transmission of the optical signal 130 through the waveguide 115, it is advantageous for the waveguide segments 122, 124 to be substantially straight. For example when the curved segment 126 has a radius of curvature of about 5 microns then the radius of curvature of the substantially straight segments can be about 25 to 50 microns or greater. In some embodiments, however to facilitate a more compact modulator design, the curved segment 126 has a radius of curvature in the range of about 1 to 50 microns and even more preferably about 1 to 20 microns. In other cases, to facilitate a more compact modulator design, waveguide substantially straight segments 122, 124 may have a radius of curvature that is about 5 to 10 times larger than the radius of curvature of the curved segment 126.

As discussed above, the disclosed configuration of electrical contacts 120 facilitates having a substantially greater modulation response than certain conventional configurations. This, in turn, can permit a decrease in the dimensions of the waveguide 115. For instance, in some embodiments, to facilitate a compact modulator design, the first and second segments 122, 124 both have a lengths 150, 152 of about 2000 microns or less, and even more preferably lengths 150, 152 in a range of about 10 to 200 microns. In some cases, as shown in FIG. 1A, the segments 122, 124 have substantially the same lengths 150, 152 (e.g., same within 10 percent), although in other cases the lengths 150, 152 can be different from each other.

Alternatively or additionally, the substantially greater modulation response realized in the disclosed modulator 110 embodiments can facilitate a substantial reduction in the strength of the electrical drive signal 140, e.g., a lower $V_{p-p}$, than otherwise possible. This, in turn, can beneficially reduce the energy consumption of the device 102. For instance, in some cases, the drive signal 140 is about 5 Volts or less (e.g., $V_{p-p}$) and more preferably, in a range of about 0.1 to 2 Volts. In some embodiments, the drive signal 140 is substantially equal to (e.g., the same within 10 percent) the operating voltage of transistors present in electrical components of the device 102. For instance, the device 102 can further include integrated circuits (IC) having complementary metal-oxide semiconductor (CMOS) devices (not show) that operate at about 1.2 Volts. In such embodiments, it is advantageous to configure the drive signal 140 to equal about 1.2 Volts.

In some embodiments, to maximize the extent of electric field-optical interaction, it is desirable for the contact's lengths to correspond to a substantial fraction of the lengths of the first and second segments of the waveguide. For instance, in some preferred embodiments the anode and cathodes (e.g., anode 142 and cathode 144) adjacent to a segment of the waveguide 115 (e.g., first segment 122) have lengths 154, 155 that range from 50 to 90 percent of the length 150 of the segment 120. For instance, when the length 150 of the segments 122 is about 10 microns, then the lengths 154, 155 of the anode 142 and cathode 144 can both range from about 5 to 9 microns.

In some embodiments, the modulator 110 is a lumped electro-optic modulator. That is, the drive signal 140 increases and falls globally substantially across the entire length of the regions of electric field-optical interaction which occur along the lengths of the electrical contacts 120 (e.g., length 154 of the anodes 142 and 146, and length 155 of the cathodes 144 an 148). Such can be the case, for instance, when the wavelength of the highest frequency of electrical field emanating from the electrical contacts 120 is large compared to the lengths 154, 155 of the anode and cathode contacts 120. For example, the ratio of the shortest radiofrequency wavelength of the drive signal 140 (e.g., the highest frequency of radiofrequency component useful for information transfer) to the individual lengths 154, 155 of the anode and cathode contacts 120 is about 10:1 or greater. For example, when the shortest radiofrequency wavelength of the drive signal 140 equals 1 cm then the individual lengths 154, 155 equal 0.1 cm or less. This can be advantageous in some embodiments of the present disclosure because the electrical field from the electrical contacts 120 can uniformly operate on the signal 130 as it passes through the different segments 122, 124 of the waveguide 115.

In other embodiments, however, modulator 110 can be configured as a traveling wave modulator. In contrast to lumped electro-optic modulators, for traveling wave modulators the wavelength of the highest frequency component of radiofrequency wavelength of the electrical field is comparable to or smaller than the individual lengths 154, 155 of the anode and cathode contacts 120. For example, the ratio of the shortest useful radiofrequency wavelength of the drive signal 140 to the contact's 120 lengths 154, 155 can be about 20:1 or less. For example, when the shortest useful radiofrequency wavelength of the drive signal 140 equals 1 cm then the individual lengths 154, 155 equal 0.05 cm or greater. In some cases, a mixture of traveling wave and lumped operation can occur. This can be the case, for example, when the shortest radiofrequency wavelength of the drive signal 140 equals 1 cm, and the individual lengths 154, 155 range from 0.1 to 0.05 cm.

In some embodiments where the modulator is configured as a traveling wave modulator, there is a concern that by the time that the optical signal 130 goes into the second segment 124 the electrical field from the electrical contacts 120 will have dissipated, or, will operate against the phase shift achieved in the first segment 122, and therefore, may only partially operate on the signal 130 in the second segment 124. Nevertheless, benefits may still be obtained even if the electrical field has partially dissipated. Moreover, in some cases, it is possible to adjust the velocities of one or both of the optical signal 130, or, radiofrequency of the drive signal 140, such that more of the electrical field from the contacts 120 is present when the optical signal 130 passes through the second segment 124. One skilled in the art would be familiar with various ways to adjust velocity of the optical signal 130 passing through the waveguides, or, to adjust the velocity of drive signal 140 propagation.

For example, one could form open (e.g., air-filled) trenches near (e.g., within about 5 microns) one or both of the electrodes 170, 172 but more than about 0.5 to 3 microns away from the waveguide 115. In such cases, the speed of drive signal 140 (e.g., radiofrequency) propagation could be increased while having a minimal effect on the speed of propagation of the optical signal 130. Alternately, a high dielectric constant material could similarly be incorporated near the electrodes 170, 172 to slow down the speed of the drive signal 140 propagation. Alternatively or additionally, one or both of the cross-sectional dimensions of the waveguide's segments 122, 124 could be modified to significantly alter the speed of optical signal 130 propagation while having a minimal effect on drive signal 140 propagation.

In some embodiments such as shown in FIG. 1A, the device 102 (e.g., modulator 110) is configured as an optical phase shifter. That is, the information encoded in the drive signal 140 becomes encoded as changes in the phase of the output optical signal 135.

Figure 2:
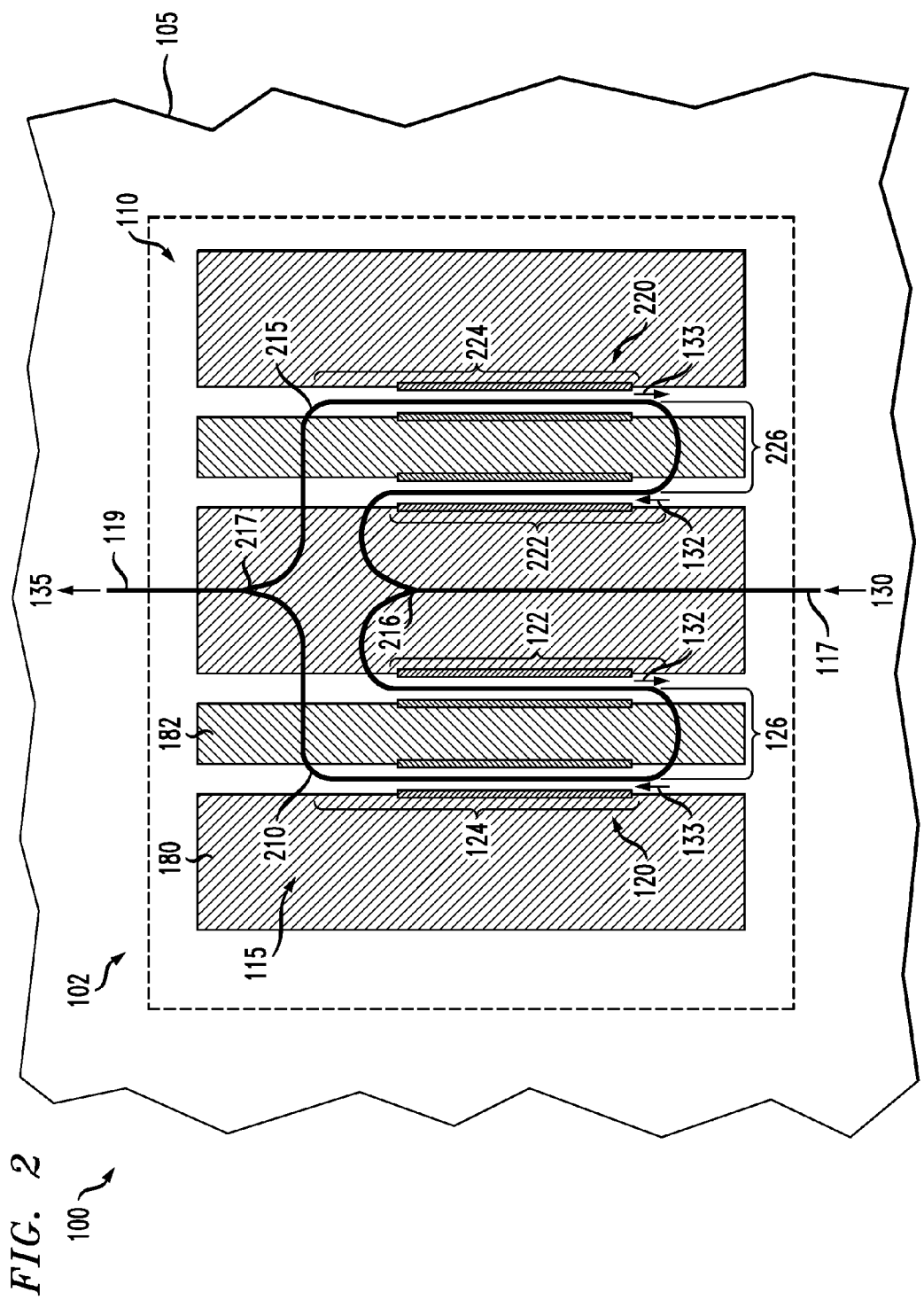
FIG. 2 shows a plan view of another example embodiment of an apparatus of the disclosure comprising an electronic-photonic device.

In other embodiments, such as shown in FIG. 2, the device 102 (e.g., modulator) is configured as an amplitude modulator (e.g., a Mach-Zehnder amplitude modulator). In addition or alternately to phase encoding, the information in the drive signal 140 (FIG. 1B) can be encoded into the amplitude of the output optical signal 135. When modulator 110 is configured as an amplitude modulator, the waveguide 115 further includes at least two optical arms 210, 215 (FIG. 2). The waveguide 115 is configured to receive the input optical signal 130 at the input end 117, split the signal 130 between the two arms 210, 215 (e.g., at optical power splitter 216). E.g., One end of each internal optical arm 210, 215 is connected to an optical power splitter 216. The signal 130 is recombined at the output end 119 at an optical power coupler 217 along the waveguide 115. E.g., the optical power splitter 216 can receive the input optical signal 130 from the input 117, and power splits the input signal 130 so that a portion thereof can be directed to each of the two internal optical arms 210, 215. E.g., about 50 percent can be directed to each arm 210, 215. E.g., second ends of the internal optical arms 210, 215 connect to inputs of an optical coupler 217, which recombines the light to produce and output light signal 135 at the output port 119. In another embodiment, the splitting ratio of the input coupler 216 is such that this optical powers recombining at coupler 217 are about equal when the modulator is creating a zero-bit or minimal output from the device.

Recombination is preferably after the locations where the electrical contacts 120 operate on the signal 130 in the waveguide 115. At least one of the arms (e.g., arm 210) includes the first segment 122, curved segment 126 and second segment 124, which can be configured the same as described above in the context of FIG. 1A. However, to more completely operate on the optical signal 130, the second arm 215 can also include electrical contacts 220, a first segment 222, a second segment 224, and a curved segment 226. The electrical contacts 220 (including its component anodes and cathodes), segments 222, 224, and the second arm 215 can be configured similar to that described for the counter-part components in the context of FIG. 1A-1B (e.g., for a single-arm modulator 110).

In some embodiments, such as shown in FIG. 2, the first arm and second arm 210, 215 of the waveguide 115 have substantially equal total lengths (e.g., the same lengths differ by about 10 percent or less). This can sometimes be advantageous because the extent of phase change in the signal 130 passing through each arm 210, 215 for a given unit of change to the applied drive signal 140 can then be independent of the wavelength of the signal 130. In other embodiments, however, the first arm and second arm 210, 215 can have different lengths.

Other embodiments of the device 102 can have modulators 110 that include multiple electrical contacts, curved segments, segments and arms can be configured similar to that discussed for these structures in the context of FIGS. 1-2.

Figure 3:
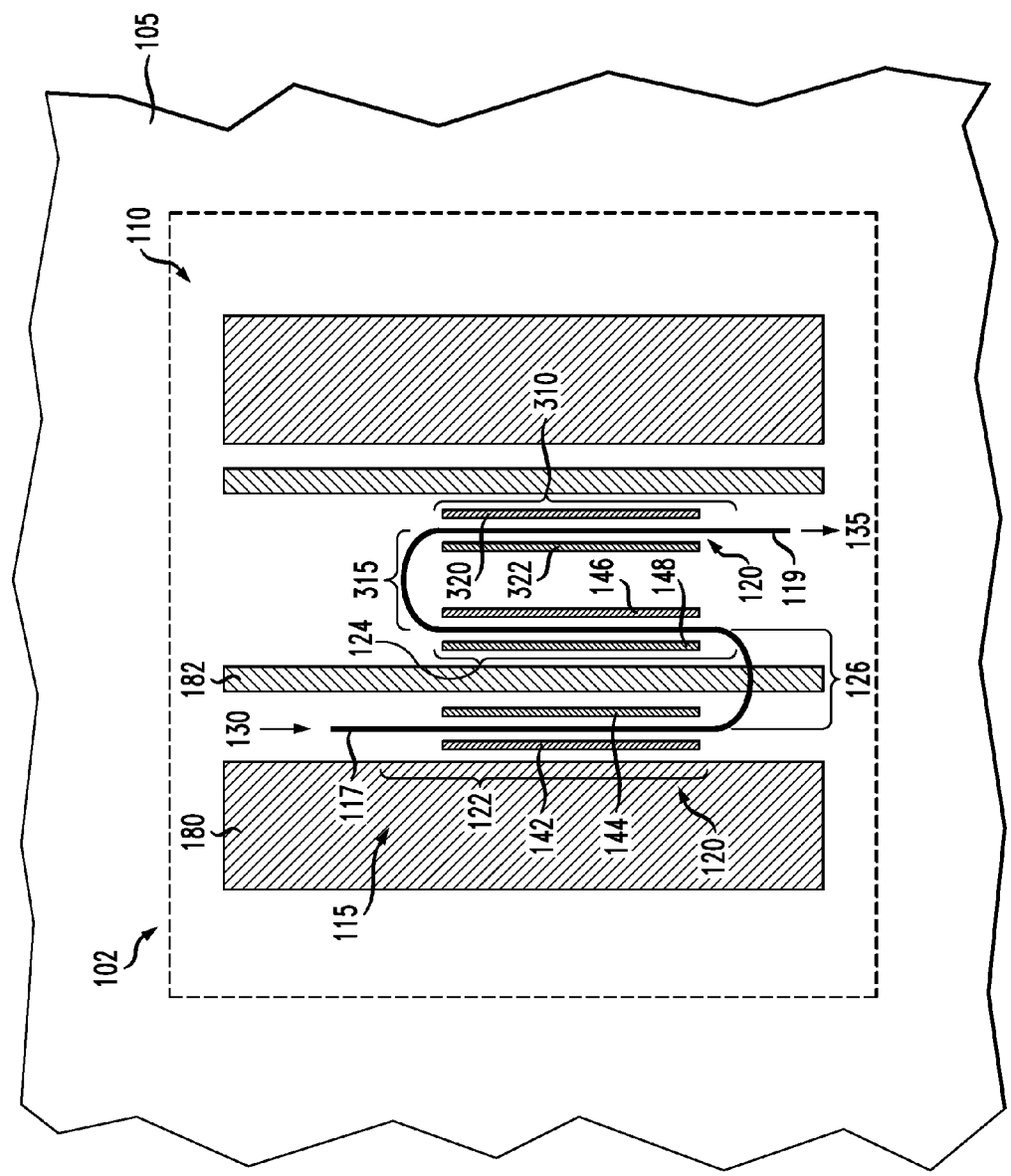
FIG. 3 shows a plan view of another example embodiment of an apparatus of the disclosure comprising an electronic-photonic device.

For instance, FIG. 3 shows an embodiment of the modulator 110 (e.g., an optical phase-shifter) whose waveguide 115 further includes a third segment 310 that is separated from the second segment 124 by a second curved segment 315 of the waveguide 115. The third segment 310 can be operated on to produce about the same phase response on the input optical signal 130 as in the first and second segments 122, 124. To facilitate this, the electrical contacts 120 can further include a third anode 320 and third cathode 322, which can be configured with respect to the third segment 310 similar to that discussed for the first segment 122 in the context of FIGS 1A-1B. For instance, the third cathode 322 is to the left of the third substantially straight segment 310 and the third anode 324 is to the right of the third substantially straight segment 310.

Figure 4:
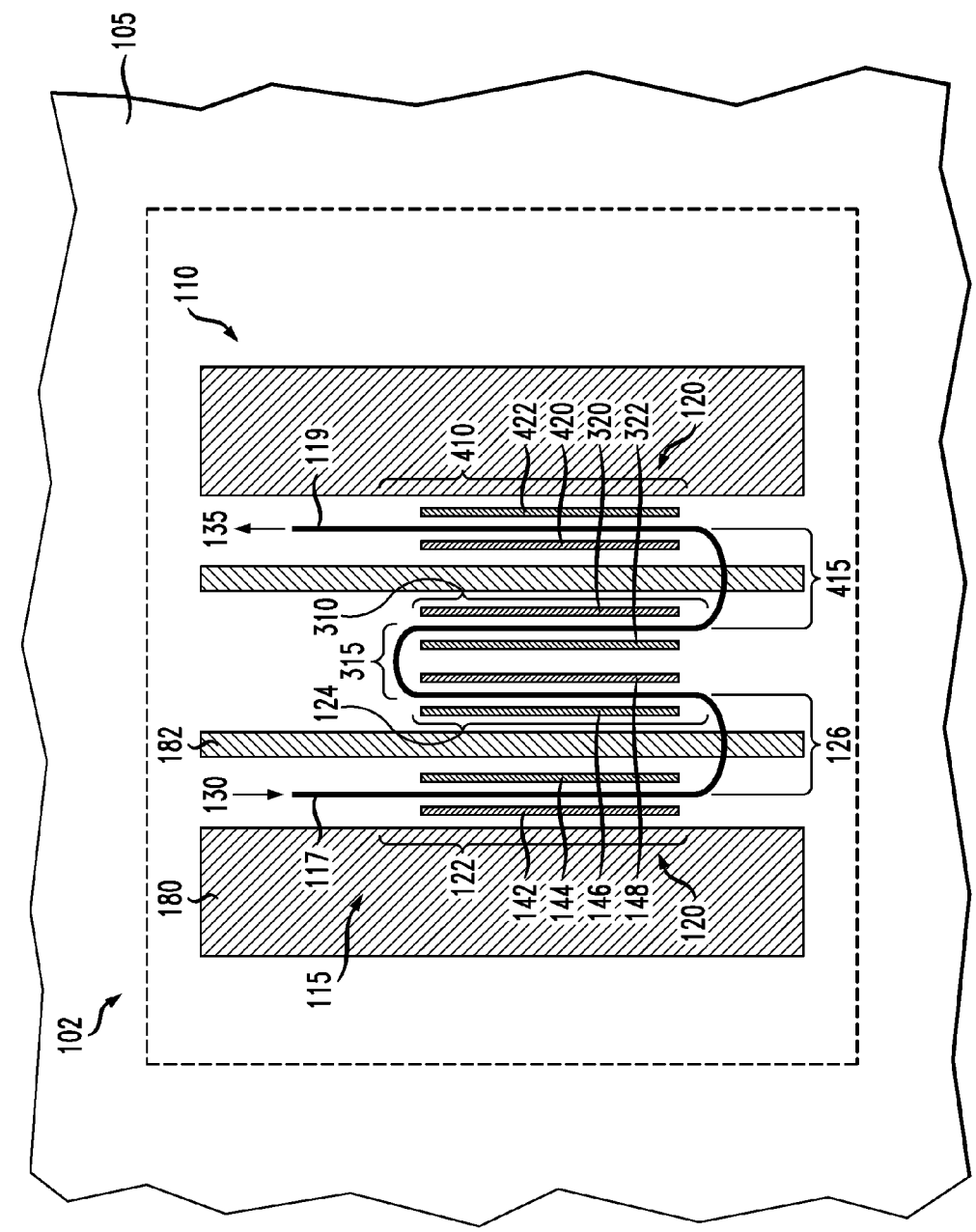
FIG. 4 shows a plan view of another example embodiment of an apparatus of the disclosure comprising an electronic-photonic device.

As another example, FIG. 4 shows an embodiment of the modulator 110 (e.g., an optical phase shifter modulator) that further includes a fourth segment 410. The fourth segment 410 is separated from the third segment 310 by a third curved segment 415 of the waveguide 115. It is desirable to operate on the fourth segment 410 such that the phase of the input optical signal 130 undergoes substantially the same type of response to the applied electrical signal 140 (e.g., the phase can substantially changes in the same direction as the change in the first, second and third segments 122, 124, 310). This can be facilitated by having the electrical contacts 120 further include a fourth anode 420 and fourth cathode 422. The fourth anode and cathode 420, 422 can be configured with respect to the fourth segment 410 similar to that discussed for the second segment 124 in the context of FIGS. 1A-1B. For instance, the fourth cathode 422 is to the right of the fourth substantially straight segment 410 and the fourth anode 420 is to the left of the fourth substantially straight segment 410.

Figure 5:
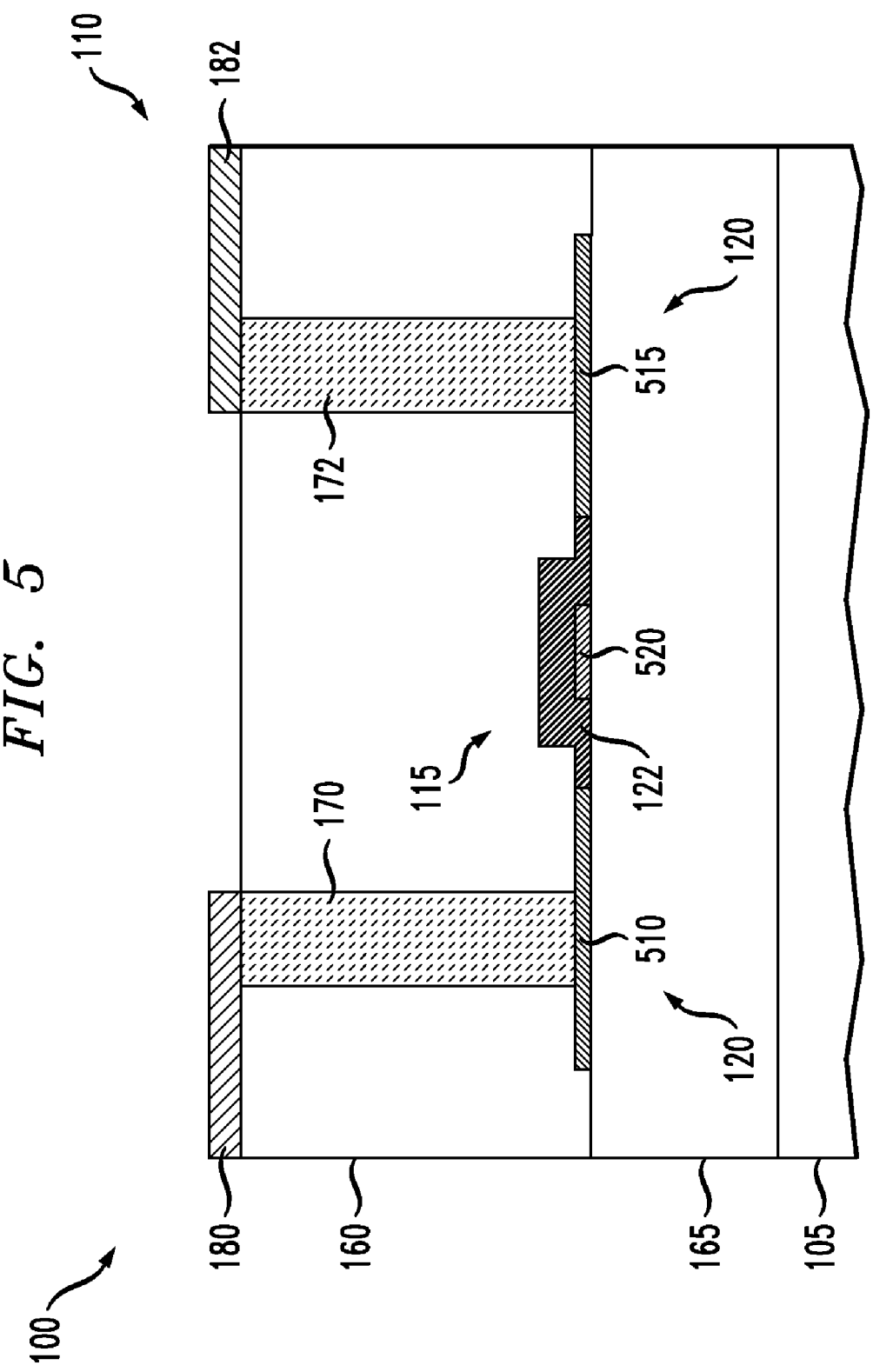
FIG. 5 shows a cross-sectional view of another example embodiment of an apparatus of the disclosure comprising an electronic-photonic device.

As another example, FIG. 5 shows a cross-sectional view (analogous to FIG. 1B) of an embodiment of the device 102 with modulator 110 that include electrical contacts 120 having two anodes 510, 515 adjacent to the waveguide 115 and one central cathode 520 located within the waveguide 115. For instance, the central cathode 520 can be located within one or both of the first and second segments of the waveguide (analogous to segments 122, 124 shown in FIG. 1A). In other embodiments, there could be an inverse configuration: two cathodes adjacent to the waveguide 115 and one central anode (not shown). An advantage of such a design is that the response of the waveguide 115 becomes nonlinear (e.g., quadratic or higher order) as opposed to linear, and therefore, the electro-optic response of the modulator 110 becomes more nonlinear. As such the modulator can better compensate for bandwidth limitations in the response of the device through its nonlinear behavior thereby producing a higher quality digital output than could be realized from a more linear device.

Based on the examples presented in FIGS. 1A-5, one skilled in the art would appreciate other configurations that waveguides 115 and its components segments and arms could have, and, the various different arrangements of the electrical contacts 120 adjacent to the waveguide 115. For instance, any of the waveguide configurations in FIGS. 3-5 could be used to form one or more arms in a waveguide 115 configuration similar to that depicted in FIG. 2.

The modulator 110 can include other components that facilitate the operation of the device. For example, as shown in FIGS. 1B and 5, the modulator 110 can further include an insulating layer 160 on the waveguide 115 and the electrical contacts 120. In some embodiments, the insulating layer 160 can also form part of an optical cladding for the waveguide 115. For instance, when the waveguide comprises silicon the insulating layer 160 may be a silicon oxide layer having a thickness 162 in a range of about 0.2 to 2 microns.

As another example, as also shown in FIGS. 1B and 5, the substrate 105 can include a middle insulating layer 165. The middle insulating layer 165 of the substrate 105 can also form part of the optical cladding. For instance, the lower insulating layer 165 can be a silicon oxide layer of a silicon-on-insulator (SOI) substrate, with the waveguide 115 formed from portions of an upper silicon layer 167 of the substrate 105. FIGS. 1B shows the upper silicon layer 167 with portions of the layer 167 removed as part of forming the waveguide 115 and contact 120 structures.

As further illustrated in FIGS. 1A and 1B, the modulator 110 can also include electrodes 170, 172 (e.g., metal-filled electrode vias composed of copper, gold or aluminum) that are configured to transmit the drive signal 140 to the electrical contacts 120. To facilitate transmitting the drive signal 140, the electrodes 170, 172 can directly touch the electrical contacts 140. For instance, for the embodiment shown in FIG. 1B, the first electrode 170 and second electrode 172 pass through the insulating layer 160 to directly touch the first anode 142 (e.g., an anode ohmic contact) and the first cathode 144 (e.g., a cathode ohmic contact), respectively. In other cases, however, the electrodes 170, 172 may not directly touch the electrical contacts 120. For instance, in some cases, the electrodes 170, 172 lay on the upper surface 174 of the insulating layer 160. In such cases, it may be desirable for the thickness 162 of the insulating layer 160 to be less than about 0.5 microns so that the potential 140 is efficiently transmitted from the electrodes 170, 172 to the electrical contacts 120.

The device 102 can include other components to facilitate its operation. For instance, as illustrated in FIG. 1A, the device can include one or more ground lines 180 and one or more conductor lines 182 (e.g., hotlines). To facilitate transmission of the drive signal 140 to the electrical contacts 120, the ground lines 180 and conductor lines 182 can be physically coupled to one or more of the electrodes 170, 172.

Figure 6:
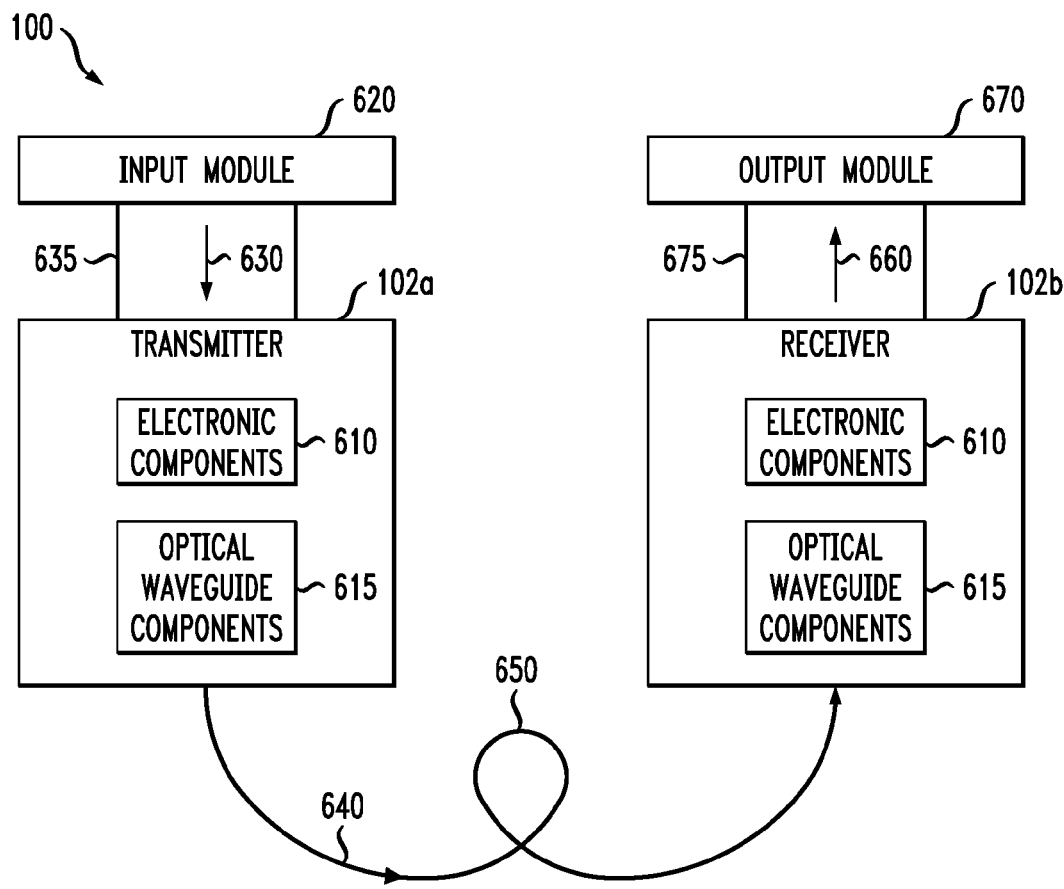
FIG. 6 shows a block diagram of an example embodiment of an apparatus of the disclosure that comprises an electronic-photonic device, such as the devices of FIGS. 1A-5.

FIG. 6 shows a block diagram of an example apparatus 100 of the disclosure that comprises an embodiment of the above-described electronic-photonic device 102 (FIGS. 1A-5). In some cases, the electronic-photonic device 102 is part of, or is, a telecommunication transceiver, in the apparatus 100 configured as a telecommunications system. The device 102 can include electronic and optical waveguide components 610, 615. For instance, the active electronic components 610 can include transistors, field-programmable arrays, RF amplifiers, or transimpedance amplifiers that are application specific integrated circuits adapted for use in a transceiver. The optical waveguide components 615 can include thermo-optic filters, electro-optic modulators, including at least one of the disclosed modulators 110 (FIGS. 1A-5), and photodetectors, that are coupled to each other, and to the active electronic components 610.

One of ordinary skill in the art would be familiar with how electronic and optical waveguide components 610, 615 of the device 102 could be configured to operate as an optical transceiver. At least some of the active electronic components 610 can be electrically coupled to at least some of the optical waveguide components 615 such that the electronic-photonic device 102 is configured as a transceiver, e.g., in a apparatus 100 configured as a telecommunications system. In some preferred embodiments, the electronic-photonic device 102 is configured to employ wavelength division multiplexing so that multiple information signals (e.g., in the form of different wavelengths of light) can be transmitted simultaneously through the device 102.

The apparatus 100 can further include an input module 620 that sends electronically-encoded-information signals 630 via a data bus 635 to at least one of the electronic-photonic devices 102a which is configured as a optical transmitter. The active electronic components 610 and optical waveguide components 615 of the transmitter device 102a cooperate to convert the electronically-encoded-information signals 630 into optically-encoded-information signals 640 (e.g., such as encoded by the disclosed optical modulators 110 of FIGS. 1A-5). The optically-encoded-information signals 640 are then transmitted through an optical transmission line 650 to another one of the electronic-photonic devices 102b which is configured as a receiver. The receiver device 102b converts the optically-encoded-information signal back into electronically-encoded-information signals 660 which are then transmitted to an output module 670 via a second data bus 675. One skilled in the art would be familiar with the variety of types of input modules 620, optical transmission line 650, output module 670 and data buses 635, 675 that could be used in telecommunications systems 600. For example, the input module 620 can be an input/output matrix or a data multiplexer that aggregates a plurality of lower data rate electronic (or optical) signals into a single (or plurality) of higher data rate signals; where data grooming, format conversion, forward error correction, and/or signal pre-distortion can be implemented. The optical transmission line 650 can be an optical fiber cable, an optical backplane, an intra-chip, or inter-chip connection. The output module 670 can be a module that performs all or some of the functions outlined for above for the input module 620. One skilled in the art would appreciate that in some embodiments, the functions of the input and output modules 620, 670 could be incorporated into the electronic-photonic devices 102a, 102b, in which case, the modules 620, 670 depicted in FIG. 6 could correspond to arrays of fiber end connections that are housed in a rack with fibers coming therein.

Figure 7:
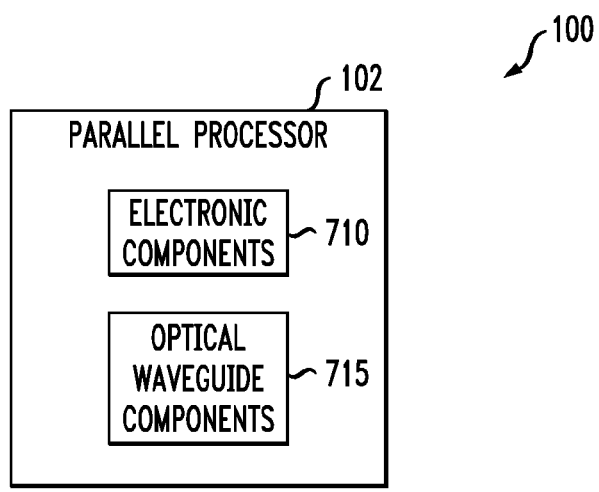
FIG. 7 shows a block diagram of an example embodiment of an apparatus of the disclosure that comprises an electronic-photonic device, such as the devices of FIG. 1A-5.
Figure 8:
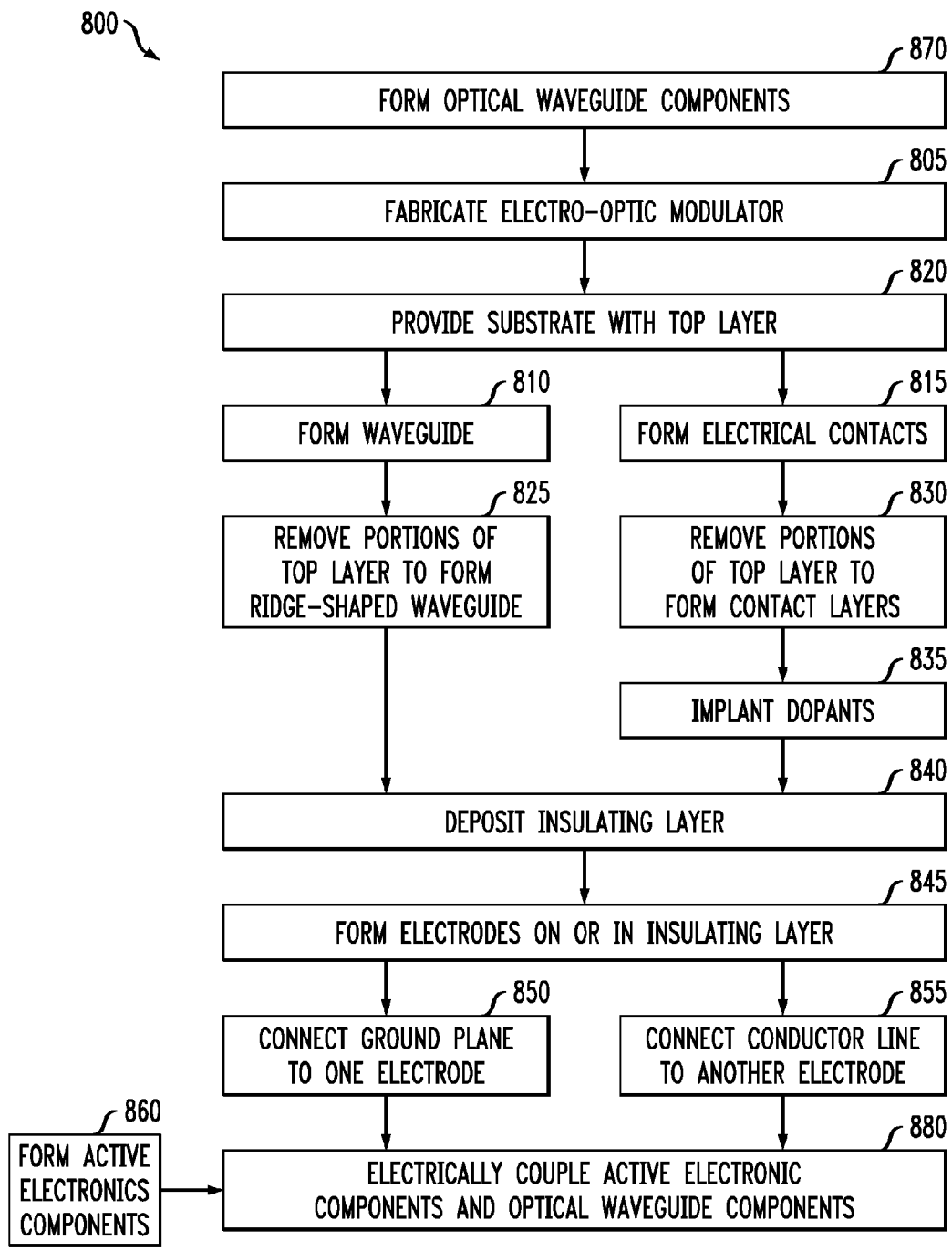
FIG. 8 shows a flow diagram of an example embodiment of a method of manufacturing an electronic-photonic device, such as the devices of FIGS. 1A-7.

FIG. 7 shows a block diagram of another example apparatus 100 of the disclosure that comprises an embodiment of the above-described electronic-photonic devices 102 (FIG. 1A-5). In some embodiments, the electronic-photonic device 102 is part of, or is, a parallel processor, in the apparatus 100 configured as a computer system. The device 102 includes electronic components 710 and optical waveguide components 715 similar to that discussed in the context of FIG. 6. At least one of the optical waveguide components 715 includes the disclosed modulator, such as one or more of the modulators 110 discussed in the context of FIGS. 1A-5.

One skilled in the arts would understand how electronic and optical waveguide components 710, 715 of the device 102 could be configured to operate as a parallel processor. For instance, the electronics components 710 can include circuits (e.g., transistors) that perform operations (e.g., parallel operations) on electronically-encoded date (e.g., information) prior to using the data to optically modulate an optical signal 130 (e.g., optical carrier) or after demodulating the data from a modulated optical signal 130.

Another embodiment of the present disclosure is a method of manufacturing an electronic-photonic device. Any of the above-described embodiments of electronic-photonic devices could be manufactured by the method disclosed herein.

With continuing reference to FIGS. 1A-7, FIG. 8 presents a flow diagram of an example method 800 of manufacturing the disclosed electronic-photonic device, such as the devices 102 discussed in the context of FIGS. 1A-7. Manufacturing the device 102 includes a step 805 of fabricating an electro-optic modulator 110. Manufacturing the electro-optic modulator 110 (step 805) includes a step 810 of forming an optical waveguide 115 on a planar substrate. The waveguide 115 including a first segment 122 and a second segment 124 (e.g., substantially straight segments) that are separated from each other by a curved segment 126. As discussed above in the context of FIGS. 1A and 1B, the first and second segments 122, 124 are continuous (and in some cases coplanar) parts of the waveguide 115. E.g., a first substantially straight segment 122 and a second substantially straight segment 124 can be end-connected by a curved segment 126. The segments 122, 124 are oriented such that the input optical signal 130 traveling through the first segment travels in an opposite direction than the signal 130 traveling through the second segment. E.g., the input optical signal 130 can travel through the first substantially straight segment 122 in an opposite direction to the direction of travel of the input optical signal 130 in the second substantially straight segment 124. Fabricating the modulator 110 (step 805) also includes a step 815 of forming electrical contacts 120 on the planar substrate. The contacts can be substantially coplanar with the waveguide 115 (e.g., the core region of the waveguide). The contacts can be configured to operate on both of the first and second segments 122, 124 such that a phase of the signal 130 substantially changes in a same direction when a drive signal 140 is applied to the electrical contacts 120.

In some embodiments, fabricating an electro-optic modulator 110 (step 805) includes a step 820 of providing a planar substrate 105 (e.g., semiconductor substrate, such as a SOI substrate) having a top layer 167 (e.g., silicon layer) on a middle layer 165 (e.g., silicon oxide layer). Preferably, the top layer 167 has a higher refractive index than the middle layer 165. In some embodiments, the silicon (or other material) top layer 167 can have a thickness 185 in a range of about 0.1 to 0.4 microns. In some cases, the middle layer 165 can have a thickness 190 in a range of about 1 to 3 microns. Forming the waveguide 115 further includes a step 825 of removing portions of the top layer 167 to form a ridged-shaped waveguide 115. For instance, photolithography and dry or wet etching procedures can be performed to selectively remove portions of a top layer 167 composed of a semiconductor material such as silicon in accordance with step 825.

In some embodiments, forming the electrical contacts 120 further includes a step 830 of removing the portions of the top layer 167 to form contact layers 142,144 (e.g., FIGS. 1A-1B). For instance, photolithography and etching procedures similar to that discussed in the context of step 825 can be used to remove portions of the top layer 167 that are adjacent to the waveguide 115. As shown in FIG. 1B, to facilitate substantially confining (e.g., containing) the optical signal 130 in the waveguide 115, it is preferable for the thickness 192 of the remaining contact layers 142, 144 to have a thickness 192 that is substantially less than a thickness 195 of the waveguide 115 (e.g., at least about 2 times thinner). For instance, when a silicon waveguide's 115 thickness 195 equals about 0.2 microns, then the contact layers 142, 144 thicknesses 192 are preferably in a range of about 0.01 to 0.1 microns.

It is sometimes desirable to increase the contact's 120 electrical conductivity by including a step 835 of implanting the different contact layers 142, 144 with one of p-type dopants to form the anodes (e.g., layer 144) or n-type dopants to form the cathodes (e.g., layer 142). For instance, standard masking and ion implantation procedures can be used to selectively implant p-type dopants (e.g., in some cases, boron implanted at doses of about 1E18 to 1E21 atoms/cm$^3$) or n-type dopants (e.g., in some cases, arsenic implanted at doses of about 1E18 to 1E21 atoms/cm$^3$) into a silicon material layer 167.

Forming the modulator 110 can further include a step 840 of depositing an insulating layer 160 on the waveguide 115 and the electrical contacts 120. In some embodiments, chemical vapor deposition is used to deposit the insulating layer 160 (e.g., a silicon oxide layer) on the waveguide 115 and the electrical contacts 120. To facilitate substantially confining the optical signal 130 within the waveguide 115, it is preferable for the insulating layer 160 to have a lower refractive index than the waveguide 115.

Forming the modulator 110 can also include a step 845 of forming electrodes 170, 172 in or on the insulating layer 160. The electrodes 170, 172 are formed in a location sufficiently close to the electrical contacts 120 to transmit the drive signal 140 to the contacts 120. In some embodiments, the openings 180 can be formed in the insulating layer 160 (e.g., via reactive ion etching or other etch processes) and then electrolytic or electroless deposition, sputtering or electron beam evaporation processes can be used to fill the openings with a metal electrode (e.g., copper).

Forming the modulator 110 (step 805) can further include a step 850 of connecting a ground plane 180 to one of the electrodes 170, and, a step 855 of connecting a conductor line 182 to a different one of the electrodes 172. For instance, a metal layer (not shown) can be deposited (e.g., via physical vapor deposition) on to the insulating layer 160, and then the metal layer can be patterned (via photolithography and etching process) to form the ground plane 180 and conductor line 182 (FIG. 1B).

Forming the device 102 can further include a step 860 of forming active electronic components 610 (FIG. 6) on the substrate, and a step 870 and of forming optical waveguide components 615 on the substrate 105. One skilled in the art would be familiar with the various methods to form electronic and optical waveguide components 610, 615 in accordance with steps 860 and 870, respectively. In some preferred embodiments, the electronic and optical waveguide components 610, 614 are formed in parallel processes in accordance with steps 860 and 870. For example, forming the active electronic components 610 can include forming MOS transistor devices. For example, forming the optical waveguide components can include forming thermo-optic filters, photo-detectors (e.g., diode-type photo-detectors) or electro-optic modulators, such as modulators 110 formed in accordance with step 805. In some embodiments, forming the device 102 can include a step 880 of electrically coupling at least one of the optical waveguide components 610 to at least one of the active electronic components 615 to form electrical connections therebetween. E.g., such connections can help configure the device 102 as an optical transceiver in an apparatus 100 (e.g., FIG. 6) configured as a telecommunications system, (e.g. an optical telecommunications system), or, as a part of a processor (e.g., a parallel processor) in an apparatus 100 configured as a computer system (e.g., FIG. 7).

Another embodiment of the disclosure is a method of transforming information. That is, electronically encoded data (e.g., a stream of electronically encoded information) is transformed into optically encoded data (e.g., a stream of optically encoded information). With continuing reference to FIGS. 1A-7, FIG. 9 presents a flow diagram of an example method 900 of transforming information in accordance with the disclosure. The method includes a step 910 of modulating an optical signal or optical carrier 130 (e.g., a stream of optically encoded information). Modulating the optical signal (step 910) includes a step 920 of passing an input optical signal or optical carrier 130 into a waveguide 115 (e.g., a waveguide of a modulator 110). As discussed in the context of FIG. 1A and 1B, in some embodiments, the waveguide 115 has first and second segments 122, 124 that are separated from each other by a curved segment 126, and the first and second segments 122, 124 are continuous parts of the waveguide 115. As illustrated in FIG. 2, in some embodiments, the first and second segments 122, 124 can be coplanar continuous parts of the waveguide 115. The segments 122, 124 are oriented such that the signal 130 passing through the first segment 122 travels in an opposite direction than the signal 130 passing through the second segment 124. E.g., substantially straight segments 122, 124 can be oriented such that the optical signal 130 passes through the first substantially straight segment 122 and the second substantially straight segment 124 travels in substantially opposite directions.

Modulating the optical signal (step 910) also includes a step 930 of applying a drive signal 140 (e.g., an alternating current) to electrical contacts 120 (e.g., electrical contacts of a modulator 110). The contacts 120 are located close enough to the first and second segments 122, 124 the response to the application of the drive signal 140 is that a total phase change of the optical signal 130 is changed in a same direction in both of the substantially straight segments 122, 124, thereby producing, in step 935, an output optical signal 135 that is phase modulated. E.g., a phase of the signal 130 can be substantially changed in a same direction in both of the segments 122, 124, thereby producing, in step 935, an output optical signal 135 that is phase modulated.

In some embodiments, modulating (step 910) can include a step 940 of splitting the input optical signal between two or more optical arms 210, 215 of the waveguide 115. At least one (and more preferably all) of the arms 210, 215 includes first and second segments 122, 124, 222, 224, configured as described above (FIGS. 1A-2). E.g., one or all of the segments 122, 124, 222, 224 can be configured as substantially straight segments. Modulating (step 910) can further include a step 950 of recombining the signal 130 from the arms 210, 215 to produce, in step 955, an output optical signal 135 that is intensity-modulated. In some embodiments, the output signal 135 can be both phase and intensity modulated.

In view of the present disclosure one skilled in the art would appreciate the additional steps that the method of transforming data can include. For instance, in step 960 data (e.g., a stream of electronically-encoded information) can be transferred to a modulator, where it is transformed into optically-encoded date (e.g., a stream of optically encoded information) by the modulator 110 in accordance with steps 920-955. In step 970, modulated output optical signal 135 (e.g., optically encoded information) from steps 935 or 955 can be transmitted (e.g., via waveguide components such as an optical fiber) to other electronic components. In step 980, the data (e.g., stream of optically encoded information) can be transformed back into electronically-encoded information.

Although the embodiments have been described in detail, those of ordinary skill in the art should understand that they could make various changes, substitutions and alterations herein without departing from the scope of the disclosure.

What is claimed is:

1. An apparatus, comprising:
 a planar electro-optic modulator being located on a substrate and including:
  a waveguide that includes first and second substantially parallel segments and a curved segment that serially end-connects the first and second substantially parallel segments such that an optical signal travels in a substantially anti-parallel manner in the first and second substantially parallel segments;
  each of said parallel segments of the waveguide being located between an adjacent n-type doped semiconductor region and an adjacent p-type doped semiconductor region; and
  electrical contacts connected to said semiconductor regions.

2. The apparatus of claim 1, wherein one of said electrical contacts is connected to said doped semiconductor regions adjacent to and located between said substantially parallel segments.

3. The apparatus of claim 1, wherein said first and second substantially parallel segments are also substantially straight segments.

4. The apparatus of claim 1, wherein said curved segment has a radius of curvature in a range from about 1 to 50 microns.

5. The apparatus of claim 1, wherein said electro-optic modulator includes an optical ring-resonator, said waveguide being a part of said optical ring-resonator.

6. The apparatus of claim 1, wherein said electro-optic modulator is an optical phase shifter.

7. The apparatus of claim 1, wherein said electro-optic modulator includes a Mache-Zehnder interferometer.

8. The apparatus of claim 1, wherein said modulator includes an optical power splitter, an optical combiner and another optical waveguide, the optical waveguides optically connecting the optical power splitter to said optical combiner.

9. The apparatus of claim 1, wherein said waveguide includes a third substantially parallel segment that is end-connected to said second substantially parallel segment by another curved segment such that said optical signal propagates in substantially anti-parallel directions in said second and third substantially parallel segments.

10. The apparatus of claim 9, wherein said waveguide includes a fourth substantially parallel segment that is end-connected to said third substantially parallel segment by another curved segment such that said optical signal propagates in substantially anti-parallel directions in said fourth and third substantially parallel segments.

11. The apparatus of claim 1, wherein said electrical contacts includes first and second anodes located adjacent to and on opposite sides of said first substantially parallel segment and said second substantially parallel segment, and, a central cathode region located within said first substantially parallel segment and said second substantially parallel segment of said waveguide.

12. The apparatus of claim 1, wherein said electro-optic modulator further includes electrodes configured to transmit said drive signal to said electrical contacts.

13. The apparatus of claim 1, further comprising an optical telecommunication transmitter, said transmitter including said planar electro-optic modulator.

14. The apparatus of claim 1, wherein said substrate is composed of silicon.

15. The apparatus of claim 1, wherein said n-type doped semiconductor region includes arsenic and said p-type doped semiconductor region includes boron.

16. A method of manufacturing an electronic-photonic device, comprising:
 fabricating an electro-optic modulator, said fabricating including:
  forming an optical waveguide on a planar substrate, the optical waveguide including a first substantially parallel segment, a second substantially parallel segment, and a curved segment, said first and second substantially parallel segments being substantially parallel and being end-coupled by said curved segment;
  forming n-type doped semiconductor regions and p-type doped semiconductor regions in said substrate, wherein each of said parallel segments of the waveguide are located between an adjacent one of said n-type doped semiconductor regions and an adjacent one of said p-type doped semiconductor regions; and forming electrical contacts that are connected to said semiconductor regions.

17. The method of claim 16, wherein forming said waveguide further includes forming said parallel waveguide segments as substantially straight waveguide segments.

18. The method of claim 16, wherein forming said electrical contacts further includes connecting one of said electrical contacts to said doped semiconductor regions adjacent to and located between said substantially parallel segments.

19. The method of claim 16, wherein fabricating said modulator further includes:

forming an insulating layer over said waveguide and said electrical contacts, wherein said insulating layer has a lower refractive index than said waveguide; and forming electrodes in or on said insulating layer next to said first and second substantially parallel segments.

20. A method of transforming information, comprising:
modulating an optical signal including:

passing said optical signal into a waveguide, said waveguide having a first substantially parallel segment and a second substantially parallel segment and a curved segment, said first and said second substantially parallel segments being end-coupled by said curved segment and being substantially parallel; and applying an alternating current drive signal to electrical contacts connected to n-type doped semiconductor regions and p-type doped semiconductor regions, wherein each of said parallel segments of said waveguide are located between an adjacent one of said n-type doped semiconductor regions and an adjacent one of said p-type doped semiconductor regions.

21. The method of claim 20, further including:

splitting an input optical signal into first and second portions, said first portion being passed into a first arm of said waveguide and said second portion being passed into a second arm of said waveguide; and recombining said modulated optical signal to amplitude modulate said optical signal.

22. The method of claim 20, wherein passing said optical signal into said waveguide includes passing said optical signal through said first and second substantially parallel segments that are also substantially straight segments.

* * * * *